United States Patent
Cha et al.

(10) Patent No.: US 9,378,544 B2
(45) Date of Patent: Jun. 28, 2016

(54) IMAGE PROCESSING APPARATUS AND METHOD FOR PANORAMIC IMAGE USING A SINGLE CAMERA

(71) Applicant: SAMSUNG ELECTRONICS CO., LTD., Suwon (KR)

(72) Inventors: Joon Hyuk Cha, Incheon (KR); Young Su Moon, Seoul (KR); Young Sun Jeon, Yongin-si (KR); Shi Hwa Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 650 days.

(21) Appl. No.: 13/761,344

(22) Filed: Feb. 7, 2013

(65) Prior Publication Data

US 2013/0242039 A1     Sep. 19, 2013

(30) Foreign Application Priority Data

Mar. 15, 2012  (KR) .................. 10-2012-0026412

(51) Int. Cl.
*H04N 7/00* (2011.01)
*G06T 5/50* (2006.01)
*H04N 5/232* (2006.01)
*H04N 13/02* (2006.01)
*G06T 3/40* (2006.01)

(52) U.S. Cl.
CPC ................. *G06T 5/50* (2013.01); *G06T 3/4038* (2013.01); *H04N 5/23238* (2013.01); *H04N 13/026* (2013.01); *H04N 13/0217* (2013.01)

(58) Field of Classification Search
CPC .................. H04N 5/232328; H04N 13/0055; H04N 13/0246; H04N 13/0007; H04N 2013/0081; G06T 2207/10012
USPC ........................................... 348/36
See application file for complete search history.

(56) References Cited

U.S. PATENT DOCUMENTS

| | | | |
|---|---|---|---|
| 6,078,701 A | 6/2000 | Hsu et al. | |
| 6,205,259 B1 * | 3/2001 | Komiya et al. | 382/284 |
| 6,424,752 B1 * | 7/2002 | Katayama et al. | 382/284 |
| 6,714,689 B1 * | 3/2004 | Yano et al. | 382/284 |
| 7,995,861 B2 * | 8/2011 | Jin et al. | 382/284 |
| 8,120,641 B2 * | 2/2012 | Kang et al. | 348/36 |
| 8,896,725 B2 * | 11/2014 | Steinberg et al. | 348/239 |

(Continued)

FOREIGN PATENT DOCUMENTS

| | | |
|---|---|---|
| CN | 101155267 | 4/2008 |
| CN | 101715053 A | 5/2010 |

(Continued)

OTHER PUBLICATIONS

Chinese Office Action issued Jan. 19, 2016 in corresponding Chinese Patent Application 201310081951.1.

*Primary Examiner* — Michael Lee
(74) *Attorney, Agent, or Firm* — Staas & Halsey LLP

(57) ABSTRACT

Provided is an apparatus and method for generating a three-dimensional (3D) panoramic image using a single camera. The image processing apparatus may generate a two-dimensional (2D) reference panoramic image using a central area of each of a plurality of input image frames, and may extract a left-eye strip and a right-eye strip of when a similarity calculated in the plurality of input image frames based on the 2D reference panoramic image has a maximum value.

23 Claims, 10 Drawing Sheets

LEFT-EYE PANORAMA     RIGHT-EYE PANORAMA

(56) References Cited

U.S. PATENT DOCUMENTS

| | | | |
|---|---|---|---|
| 2001/0038413 A1* | 11/2001 | Peleg et al. | 348/36 |
| 2001/0043264 A1 | 11/2001 | Sinclair et al. | |
| 2004/0223051 A1 | 11/2004 | Peleg et al. | |
| 2005/0089213 A1 | 4/2005 | Geng | |
| 2008/0247667 A1* | 10/2008 | Jin et al. | 382/284 |
| 2009/0245653 A1* | 10/2009 | Kochi et al. | 382/203 |
| 2010/0054628 A1 | 3/2010 | Levy et al. | |
| 2010/0289882 A1* | 11/2010 | Ohta | 348/51 |
| 2010/0302347 A1* | 12/2010 | Shikata | 348/36 |
| 2011/0043604 A1* | 2/2011 | Peleg et al. | 348/36 |
| 2011/0096143 A1* | 4/2011 | Ono | 348/36 |
| 2011/0149016 A1* | 6/2011 | Kimura | 348/36 |
| 2011/0242273 A1 | 10/2011 | Shimaya | |
| 2012/0026283 A1* | 2/2012 | Kim et al. | 348/36 |
| 2012/0069148 A1* | 3/2012 | Ueda et al. | 348/46 |
| 2012/0189167 A1* | 7/2012 | Kurata et al. | 382/107 |

FOREIGN PATENT DOCUMENTS

| | | |
|---|---|---|
| CN | 102111629 | 6/2011 |
| CN | 102131099 A | 7/2011 |
| CN | 102239697 A | 11/2011 |
| CN | 102326396 A | 1/2012 |
| JP | 2003-199034 | 7/2003 |
| JP | 2005-57801 | 3/2005 |
| JP | 2006-310975 | 11/2006 |
| JP | 2011-135246 | 7/2011 |
| KR | 10-2005-0045845 | 5/2005 |
| KR | 10-2005-0120301 | 12/2005 |
| KR | 10-2006-0120052 | 11/2006 |
| KR | 10-2008-0016605 | 2/2008 |
| KR | 10-2008-0096006 | 10/2008 |
| KR | 10-2009-0097613 | 9/2009 |
| KR | 10-2011-0032402 | 3/2011 |
| WO | 2011/162227 A1 | 12/2011 |
| WO | 2012/002046 A1 | 1/2012 |

* cited by examiner

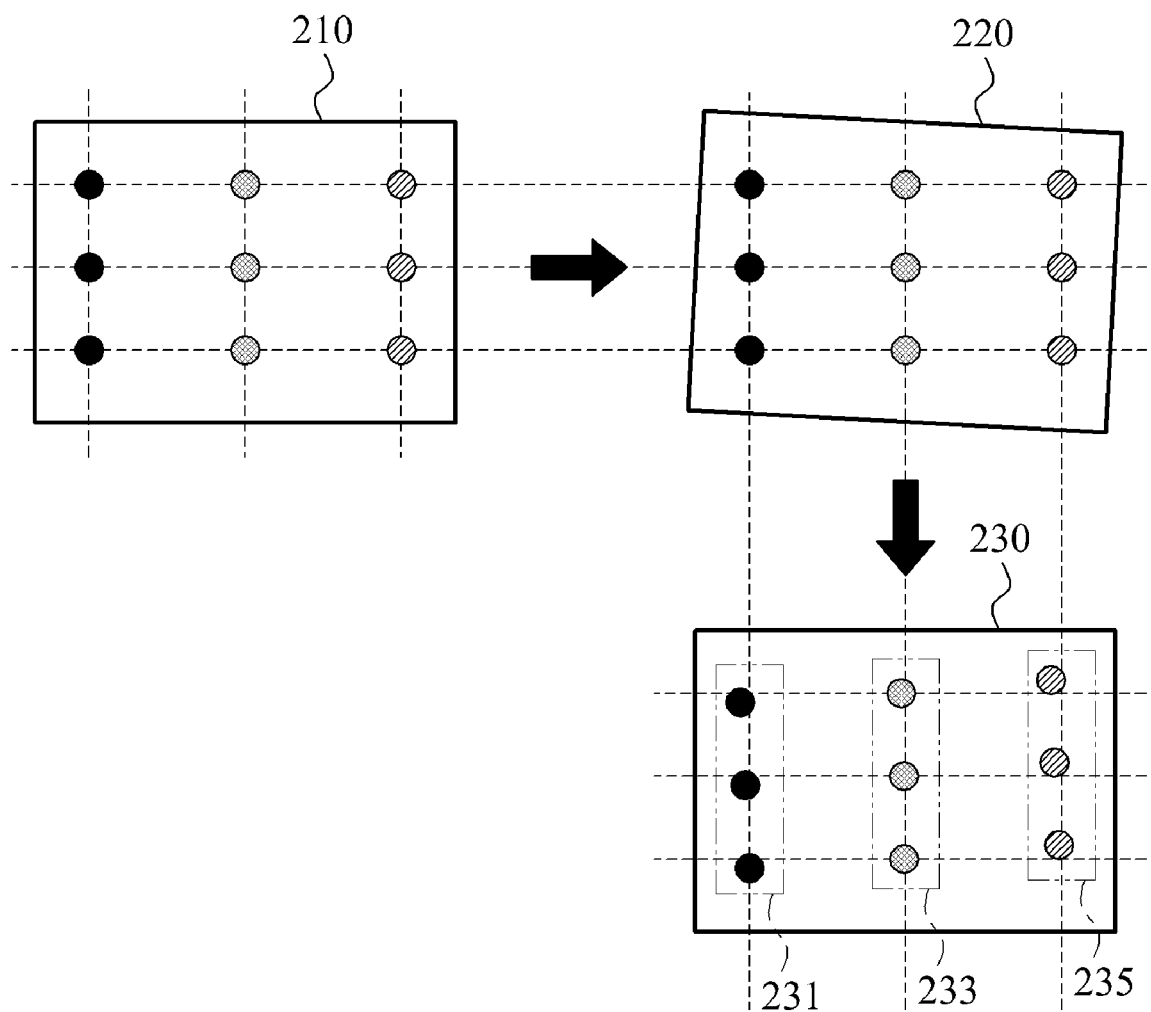

LEFT   CENTER   RIGHT

LEFT   CENTER   RIGHT

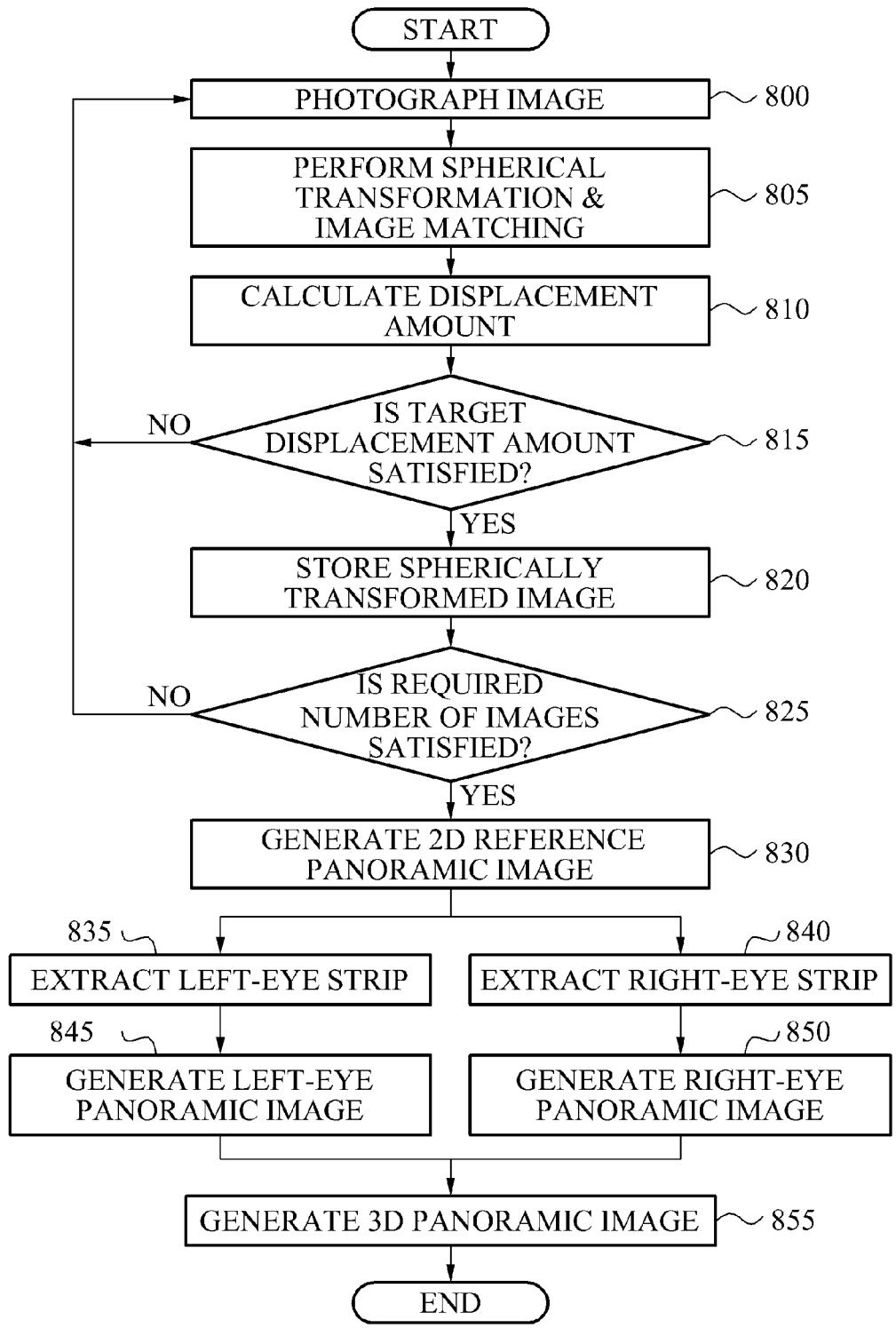

IMAGE PROCESSING APPARATUS AND METHOD FOR PANORAMIC IMAGE USING A SINGLE CAMERA

CROSS-REFERENCE TO RELATED APPLICATIONS

This application claims the priority benefit of Korean Patent Application No. 10-2012-0026412, filed on Mar. 15, 2012, in the Korean Intellectual Property Office, the disclosure of which is incorporated herein by reference.

BACKGROUND

1. Field

One or more example embodiments relate to an apparatus and method for generating a three-dimensional (3D) panoramic image using a single camera.

2. Description of the Related Art

A general panoramic image generating method may connect stereo panoramas corresponding to a left eye and a right eye, based on the assumption that a user photographs a plurality of images while horizontally panning, a camera, i.e., rotating the camera horizontally to obtain a panoramic image, without shaking the camera. However, when the photographer actually takes a photo while panning the camera, minute hand shaking or trembling may occur by the photographer. In addition, a left-eye panorama and a right-eye panorama with respect to the same point are different images having disparity and thus, quality may be degraded.

SUMMARY

The foregoing and/or other aspects are achieved by providing an image processing apparatus, including a reference generator to generate a two-dimensional (2D) reference panoramic image using a central area of each of a plurality of input image frames, and a strip extractor to extract a left-eye strip and a right-eye strip of when a similarity calculated in the plurality of input image frames based on the 2D reference panoramic image has a maximum value.

In an embodiment, the reference generator may generate the 2D reference panoramic image by blending a predetermined central area in each of the plurality of input image frames.

In an embodiment, the strip extractor may include a left-eye strip extractor to extract a left-eye strip of when a similarity calculated from a predetermined left-eye strip extraction position to a vertical direction based on the 2D reference panoramic image has a maximum value, and a right-eye strip extractor to extract a right-eye strip of when a similarity calculated from a predetermined right-eye strip extraction position to a vertical direction based on the 2D reference panoramic image has a maximum value.

In an embodiment, the left-eye strip extractor may extract a left-eye strip having a maximum correlation value through template matching of the predetermined left-eye strip extraction position in an input image frame corresponding to the 2D reference panoramic image. The right-eye strip extractor may extract a right-eye strip having a maximum correlation value through template matching of the predetermined right-eye strip extraction position in the input image frame corresponding to the 2D reference panoramic image.

In an embodiment, the strip extractor may extract the left-eye strip and the right-eye strip based on correlation between a color value of a predetermined left-eye strip extraction position and a color value of a predetermined right-eye strip extraction position in an input image frame corresponding to the 2D reference panoramic image.

In an embodiment, the strip extractor may extract the left-eye strip and the right-eye strip having the same width in an input image frame corresponding to the 2D reference panoramic image.

In an embodiment, the image processing apparatus may further include a panoramic image generator to generate a left-eye panoramic image and a right-eye panoramic image based on the left-eye strip and the right-eye strip.

In an embodiment, the image processing apparatus may further include a three-dimensional (3D) panoramic image generator to generate a 3D panoramic image based on a disparity between the left-eye panoramic image and the right-eye panoramic image.

In an embodiment, the image processing apparatus may further include a processing unit to perform spherical transformation of an image that is input from a photographing device, and to perform image matching by matching a feature point between the spherically transformed images, a calculating unit to calculate a translation amount between the spherically transformed images, a first determining unit to determine whether the translation amount satisfies a predetermined target, and a second determining unit to store the spherically transformed image when the translation amount satisfies the predetermined target, and to determine whether the number of stored spherically transformed images satisfies a value that is used to generate a 3D panoramic image.

The foregoing and/or other aspects are achieved by providing an image processing apparatus, including a global alignment unit to perform image matching of a plurality of input image frames by matching a feature point between the plurality of input image frames, and a local alignment unit to locally align a right-eye strip and a left-eye strip into a vertical direction in each of the plurality of input image frames using a 2D reference panoramic image.

In an embodiment, the 2D reference panoramic image may be generated based on a central area of each of the plurality of input image frames.

In an embodiment, the local alignment unit may extract a left-eye strip and a right-eye strip of when a similarity calculated in the plurality of input image frames based on the 2D reference panoramic image has a maximum value.

In an embodiment, the local alignment unit may generate a left-eye panoramic image and a right-eye panoramic image based on the left-eye strip and the right-eye strip.

The foregoing and/or other aspects are achieved by providing an image processing method, including generating a 2D reference panoramic image using a central area of each of a plurality of input image frames, and extracting a left-eye strip and a right-eye strip of when a similarity calculated in the plurality of input image frames based on the 2D reference panoramic image has a maximum value.

In an embodiment, the generating may include generating the 2D reference panoramic image by blending a predetermined central area in each of the plurality of input image frames.

In an embodiment, the extracting may include extracting a left-eye strip of when a similarity calculated from a predetermined left-eye strip extraction position to a vertical direction based on the 2D reference panoramic image has a maximum value, and extracting a right-eye strip of when a similarity calculated from a predetermined right-eye strip extraction position to a vertical direction based on the 2D reference panoramic image has a maximum value.

In an embodiment, the extracting may include extracting a left-eye strip having a maximum correlation value through template matching of the predetermined left-eye strip extraction position in an input image frame corresponding to the 2D reference panoramic image, and extracting a right-eye strip having a maximum correlation value through template matching of the predetermined right-eye strip extraction position in the input image frame corresponding to the 2D reference panoramic image.

In an embodiment, the extracting may include extracting the left-eye strip and the right-eye strip based on correlation between a color value of a predetermined left-eye strip extraction position and a color value of a predetermined right-eye strip extraction position in an input image frame corresponding to the 2D reference panoramic image.

In an embodiment, the image processing method may further include generating a left-eye panoramic image and a right-eye panoramic image based on the left-eye strip and the right-eye strip.

The foregoing and/or other aspects are achieved by providing a method of creating a three-dimensional (3D) panoramic image from a plurality of sequentially input image frames. The method includes generating a two-dimensional (2D) reference panoramic image using a center portion of each of the sequentially input image frames, extracting, from an input image frame of the plurality of sequentially input image frames, a left-eye strip and a right-eye strip having an similarity of the input image frame compared to the 2D reference panoramic image has a maximum value, and generating, by way of a processor, a left-eye panoramic image and a right-eye panoramic image using the extracted left-eye strip and right-eye strip.

The foregoing and/or other aspects are achieved by providing a camera to create a three-dimensional (3D) panoramic image from a plurality of sequentially input image frames. The camera includes a processor to control one or more processor-executable units, a reference generator to generate a two-dimensional (2D) reference panoramic image using a center portion of each of the sequentially input image frames, and a strip extractor to extract, from an input image frame of the plurality of sequentially input image frames, a left-eye trip and a right-eye strip having an similarity of the input image frame compared to the 2D reference panoramic image has a maximum value.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates a change in a position of a subject when a rotation occurs in an input image;

FIG. 8 illustrates an image processing method according to an embodiment.

DETAILED DESCRIPTION

Figure 1A:
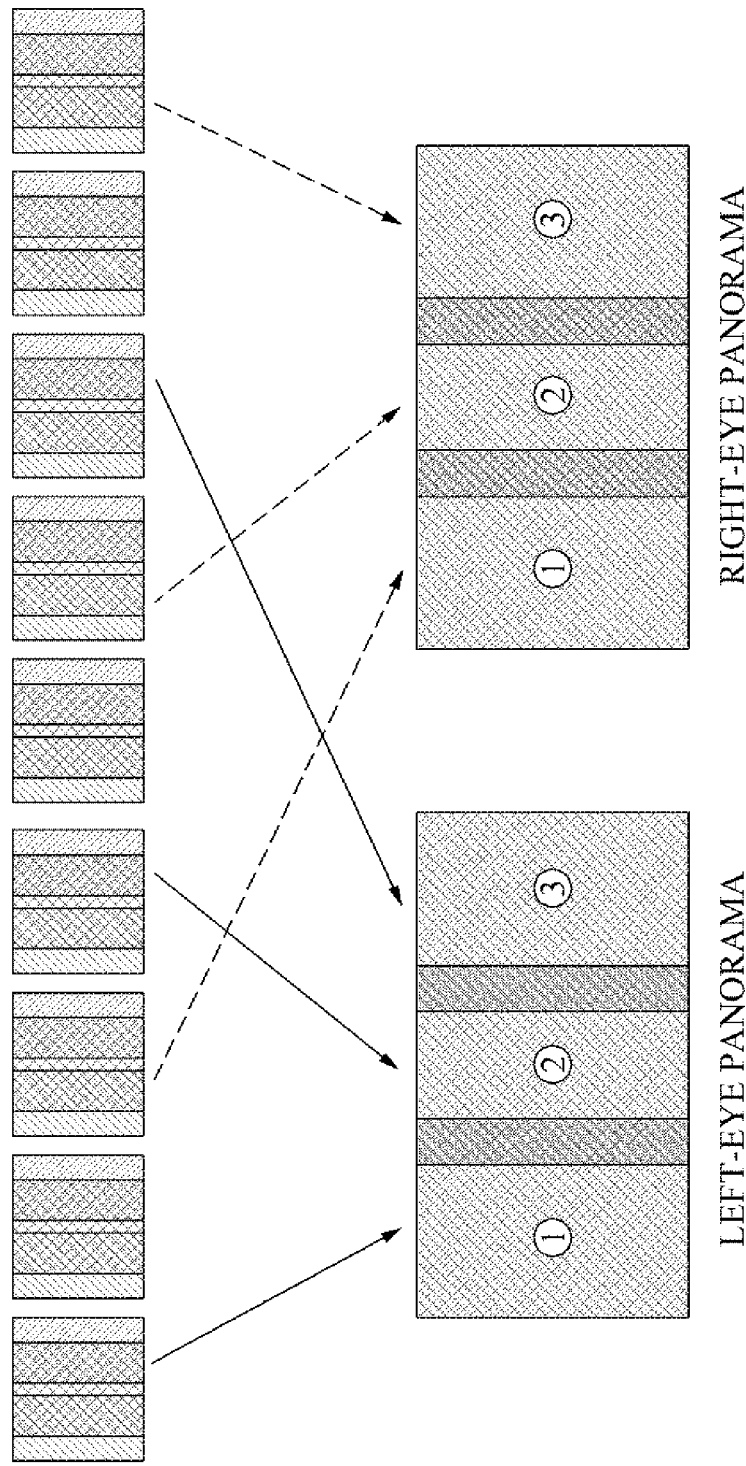
FIG. 1A illustrates an ideal input image photographed by panning a camera, in which no rotation of the camera occurs and hence no vertical translation of the input image occurs.

Reference will now be made in detail to embodiments, examples of which are illustrated in the accompanying drawings, wherein like reference numerals refer to the like elements throughout. Embodiments are described below to explain the present disclosure by referring to the figures.

A three-dimensional (3D) panoramic image may be generated based on two images, for example, a left-eye panoramic image and a right-eye panoramic image having different viewpoints. However, when the left-eye panoramic image and the right-eye panoramic image are generated incorrectly or inconsistently, or when mismatching of a subject occurs at a position from which the same subject is observed, quality degradation resulting in dizziness on the part of a viewer may occur.

In particular, with respect to the same subject, an input strip extraction position of the left-eye panoramic image may be different from an input strip extraction position of the right-eye panoramic image. Due to a time difference between the left-eye panoramic image and the right-eye panoramic image, local motion is highly likely to occur. Therefore, quality degradation resulting in dizziness may occur at a predetermined portion of the 3D panoramic image.

Accordingly, precise local alignment may also be used with respect to the left-eye panoramic image and the right-eye panoramic image. Such precise local alignment may be more effective than global alignment using translation information between input images.

FIG. 1 illustrates a sequence of an image photographed using a single camera.

Global translation information may be obtained by performing spherical transformation and image matching using feature point matching with respect to a plurality of consecutive input images. That is, translation information of a photographed subject may be obtained from an input image.

Here, to maximally match a left-eye panoramic image and a right-eye panoramic image, an input frame having the same or similar amount of translation may need to be selected as an input of a panoramic image.

However, when a user or photographer takes a panorama photograph by holding and directly panning the camera, shaking or trembling of the photographer may occur during the taking of an input image. Here, the shaking may be expressed in the form of rotational translation together with horizontal and vertical translation in an input image. In the case of the horizontal and vertical translation, the shaking may be calibrated during a global alignment process such as that performed by spherical transformation and image matching using feature point matching of consecutive input images. However, when a rotation is present in an input image due to the rotational translation, it may be difficult to align the left-eye panoramic image and the right-eye panoramic image. Dizziness on the part of a viewer of the image may occur due to difficulty in aligning an area where the rotation is present.

Figure 1B:
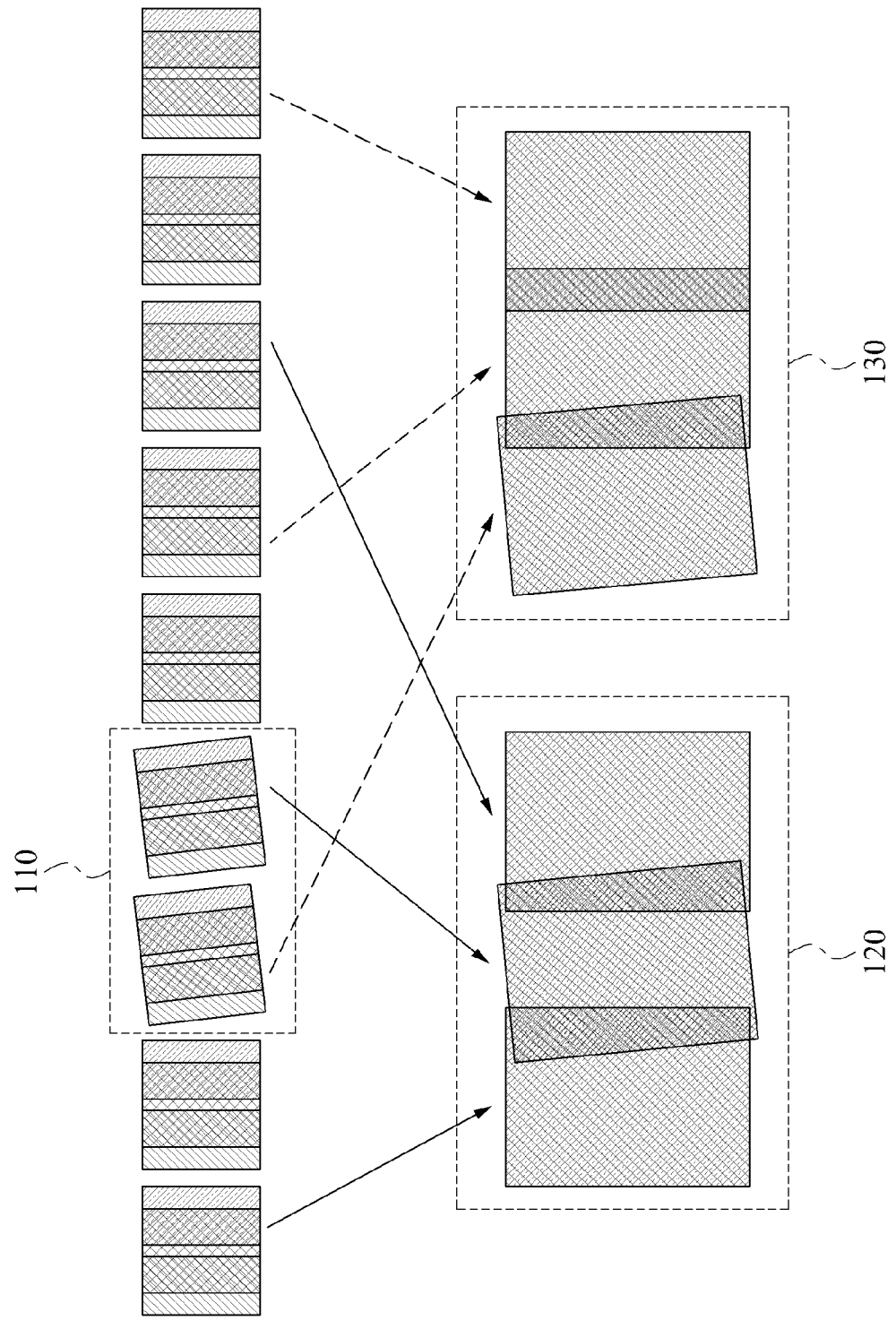
FIG. 1B illustrates an input image photographed by panning a camera, in which rotation occurs due to shaking of the camera.

FIG. 1A illustrates an ideal input image photographed by panning a camera, in which no rotation of the camera occurs and hence no vertical translation of the input image occurs. Referring now to FIG. 1B, when rotation does occur in input images 110 due to shaking of the camera, the rotation may also occur in a left-eye panoramic image 120 and a right-eye panoramic image 130 that are generated based on the input images 110. Even though the images are obtained by photographing the same subject, mismatch may occur in the images due to the rotation and thus, a viewer may experience dizziness and thereby feel inconvenienced.

FIG. 2 illustrates a change in a position of a subject when a rotation occurs in an input image.

When rotation occurs in the input image, a translation value of a left-eye strip that is an input of a left-eye panoramic image and a translation value of a right-eye strip that is an input of a right-eye panoramic image may vary.

Image 210 shows a case in which shaking of a camera is absent during the photographing. Image 220 shows a case in which the camera is tilted to the right during the photographing. Image 230 shows a rotation of a subject captured by the camera. It can be seen that, compared to image 210, a right area 235 and a left area 231 are significantly rotated upward and downward, respectively, in comparison with central area 233. That is, serious change has occurred in the right area 235 of the image and the left area 231 of the image compared to the central area 233 of the image.

Global translation information between input image frames is measured as the average of the entire image. Therefore, even though the rotation occurs, a translation value need not greatly vary. For example, it can be seen that the vertical translation of a right-eye strip and a vertical translation of a left-eye strip may occur in opposite directions such as with left-eye strip 231 and right-eye strip 235 of FIG. 2. When the vertical translation of the left-eye strip and the right-eye strip occur in equal amounts but in opposite directions, as in image 230 of FIG. 2, the measured global translation information may not vary significantly since it is measured as an average. A variation of the average horizontal, for example, x-axial translation value by the rotation may be significantly smaller than a variation of the average vertical, for example, y-axial translation value. Hence in FIG. 2, the average translation in the horizontal direction (x axis) caused by the rotation does not vary at a significant level.

Accordingly, when local alignment of the right strip and the left strip is performed primarily with respect to the vertical direction while also aligning the left-eye panorama and the right-eye panorama using global alignment information, it is possible to generate a left-eye panorama and a right-eye panorama that are better aligned than when only global alignment is performed.

Figure 3:
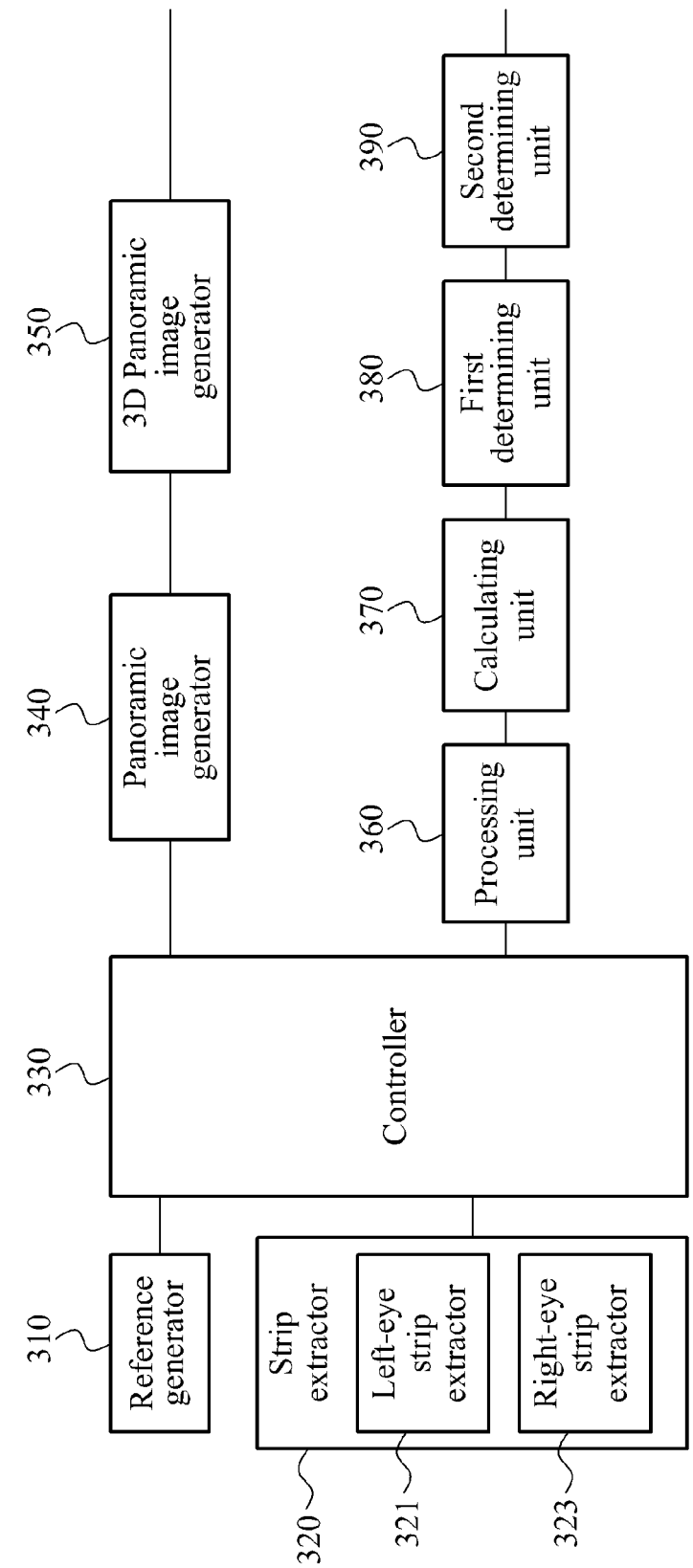
FIG. 3 illustrates an image processing apparatus according to an embodiment.

FIG. 3 illustrates an image processing apparatus according to an embodiment.

Referring to FIG. 3, the image processing apparatus may include, for example, a reference generator 310, a strip extractor 320, a controller 330, a panoramic image generator 340, and a 3D panoramic image generator 350.

The reference generator 310 may generate a 2D reference panoramic image using a central area of each of a plurality of input image frames. In an embodiment, the central area may correspond to a central area when an input image frame is divided into three areas, for example, a left area, the central area, and a right area, based on a predetermined criterion. The criterion may be set in the image processing apparatus. The criterion may be adjusted based on a user setting, and may also be determined based on a translation amount of rotation.

The plurality of input image frames may indicate images that are photographed using a photographing device or camera at predetermined time intervals. The predetermined time intervals may be of equal or different durations, depending on the embodiment.

The reference generator 310 may generate the 2D reference panoramic image by blending a predetermined central area in each of the plurality of input image frames. A rotation translation amount may be relatively small in the central area in comparison to the left area or the right area. The 2D reference panoramic image generated through blending of the central areas may be used as a reference image for either a strip that is extracted from a left area of an input image or a strip that is extracted from a right area of the input image, or both.

The strip extractor 320 may extract a left-eye strip and a right-eye strip when a similarity calculated in the plurality of input image frames based on the 2D reference panoramic image has a maximum value. For example, the similarity may be calculated through template matching. The strip extractor 320 may extract, from the input image, the left-eye strip and the right-eye strip when the similarity calculated through template matching has a maximum value. As another example, the similarity may be calculated by matching feature points. The schemes of matching feature points may vary depend on the kinds of feature points. As another example, the similarity may be calculated by matching a pattern. As another example, the similarity may be calculated by matching a histogram.

The strip extractor 320 may compare translation amounts of each of the plurality of input image frames, may estimate an input image frame having the same translation amount as the 2D reference panoramic image, and may determine a similarity between the 2D reference panoramic image and the input image frame having the same translation amount.

The strip extractor 320 may include a left-eye strip extractor 321 and a right-eye strip extractor 323.

The left-eye strip extractor 321 may extract a left-eye strip when a similarity calculated form a predetermined left-eye strip extraction position to a vertical direction based on the 2D reference panoramic image has a maximum value.

The left-eye strip may indicate a slit of an image that is viewed with a left eye of a user. For example, among positions for extracting the left-eye strip, a horizontal position may be determined through a previous process of a process of generating the 2D reference panoramic image. The horizontal position may be determined while performing image matching between the plurality of input image frames.

Alternatively, the horizontal extraction position of the left-eye strip may be set as an initial value of a photographing device or a setting value of the photographer.

The left-eye strip extractor 321 may calculate the similarity while matching an input image frame with a template of the 2D reference panoramic image with respect to a vertical direction, i.e., up and down. The left-eye strip extractor 321 may extract, from an input image frame, a left-eye strip of a position having a similarity closest to a predetermined similarity, or may extract a left-eye strip of a position having a maximum similarity. For example, when the predetermined similarity is 90%, the left-eye strip extractor 321 may extract a left-eye strip of a position having a similarity closest to 90%.

The right-eye strip extractor 323 may extract a right-eye strip when a similarity calculated from a predetermined right-eye strip extraction position to a vertical direction based on the 2D reference panoramic image has a maximum value.

The right-eye strip may indicate a slit of an image that is viewed with a right eye of the user. For example, among positions for extracting the right-eye strip, a horizontal position may be determined through a previous process of a process of generating the 2D reference panoramic image. The horizontal position may be determined while performing image matching between the plurality of input image frames.

Alternatively, the horizontal extraction position of the right-eye strip may be set as an initial value of the photographing device or a setting value of the photographer.

The right-eye strip extractor 323 may calculate the similarity while matching an input image frame with a template of the 2D reference panoramic image with respect to a vertical direction, i.e., up and down. The right-eye strip extractor 323 may extract, from an input image frame, a right-eye strip of a position having a similarity closest to a predetermined similarity, or may extract a right-eye strip of a position having a maximum similarity. For example, when the predetermined similarity is 90%, the right-eye strip extractor 323 may extract a right-eye strip of a position having a similarity closest to 90%.

The left-eye strip extractor 321 may extract a left-eye strip having a maximum correlation value through template matching of the predetermined left-eye strip extraction position in an input image frame corresponding to the 2D reference panoramic image. For example, a correlation value may be calculated through template matching. As another example, the correlation value may be calculated by matching feature points. The schemes of matching feature points may vary depend on the kinds of feature points. As another example, the correlation value may be calculated by matching a pattern. As another example, the correlation value may be calculated by matching a histogram.

The right-eye strip extractor 323 may extract a right-eye strip having a maximum correlation value through template matching of the predetermined right-eye strip extraction position in the input image frame corresponding to the 2D reference panoramic image. For example, a correlation value may be calculated through template matching. As another example, the correlation value may be calculated by matching feature points. The schemes of matching feature points may vary depend on the kinds of feature points. As another example, the correlation value may be calculated by matching a pattern. As another example, the correlation value may be calculated by matching a histogram.

The strip extractor 320 may extract the left-eye strip and the right-eye strip based on correlation between a color value of a predetermined left-eye strip extraction position and a color value of a predetermined right-eye strip extraction position in an input image frame corresponding to the 2D reference panoramic image. The strip extractor 320 may calculate a correlation value by comparing a red, green, blue (RGB) value of a template of the 2D reference panoramic image with the input image frame. The strip extractor 320 may extract a strip of a position having a maximum correlation value in the input image frame.

The strip extractor 320 may extract the left-eye strip and the right-eye strip having the same width in an input image frame corresponding to the 2D reference panoramic image. The strip extractor 320 may extract strips having the same width. For example, left strips and right strips extracted from the input image frame may have the same width.

The panoramic image generator 340 may generate a left-eye panoramic image and a right-eye panoramic image based on the left-eye strip and the right-eye strip extracted by the strip extractor 320. The panoramic image generator 340 may generate a left-eye panoramic image by blending left strips. The panoramic image generator 340 may generate a right-eye panoramic image by blending right strips.

The 3D panoramic image generator 350 may generate a 3D panoramic image based on a disparity between the left-eye panoramic image and the right-eye panoramic image. The 3D panoramic image generator 350 may employ any technology for generating a 3D image based on a disparity used in the image processing field. Also, the 3D panoramic image generator 350 may employ any technology for generating a 3D image that is based on a 2D stereo image.

A processing unit 360 may perform spherical transformation of an image that is input from a photographing device or camera, and may perform image matching by matching a feature point between the spherically transformed images. An input image is photographed from a circular baseline and thus, may be distorted. The processing unit 360 may perform spherical transformation of a distorted image by considering a distance and an angle based on a position at which the input image is photographed. The processing unit 360 may perform feature point matching between spherically transformed images. A feature point may be determined based on a shape, a color, and the like of a subject in the input image.

A calculating unit 370 may calculate a translation amount between the spherically transformed images. When image matching is completed in the processing unit 360, the calculating unit 370 may calculate a translation amount between input images based on the image matching result. For example, the calculating unit 370 may calculate a distance of the subject that has moved in the input image.

The calculating unit 370 may obtain translation information of the input image through calculation of the translation amount. A horizontal position of a left-eye strip and a horizontal position of a right-eye strip may be determined based on the translation information.

A first determining unit 380 may determine whether the translation amount satisfies a predetermined target. When the calculated translation amount does not satisfy the predetermined target, the first determining unit 380 may not store a spherically transformed image and may request that the image be re-photographed.

A second determining unit 390 may store the spherically transformed image when the translation amount satisfies the predetermined target, and may determine whether the number of stored spherically transformed images satisfies the number of images that are used to generate a 3D panoramic image. For example, the number of images that are used to generate the 3D panoramic image may be determined based on a resolution of the 3D panoramic image, a capacity, and a processing rate of the image processing apparatus.

When the number of stored spherically transformed images satisfies the number of images that are used to generate the 3D panoramic image, the stored spherically transformed images may be input images that are used to generate the 2D reference panoramic image.

The controller 330 may perform overall control of the image processing apparatus, and may perform functionalities of the reference generator 310, the strip extractor 320, the panoramic image generator 340, the 3D panoramic image generator 350, the processing unit 360, the calculating unit 370, the first determining unit 380, and the second determining unit 390. The above constituent elements are separately illustrated in FIG. 3 to distinctively describe functions of the respective constituent elements. Accordingly, when actually configuring a product, the above constituent elements may also be configured to be processed in the controller 330, or alternatively only a portion thereof may be configured to be processed in the controller 330.

Figure 4:
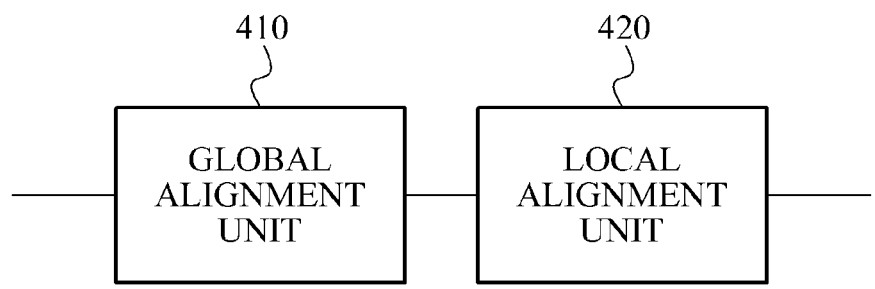
FIG. 4 illustrates an image processing apparatus according to another embodiment.

FIG. 4 illustrates an image processing apparatus according to another embodiment.

Referring to FIG. 4, the image processing apparatus may include, for example, a global alignment unit 410 and a local alignment unit 420.

The global alignment unit 410 may perform image matching of a plurality of input image frames by matching a feature point between the plurality of input image frames. The global alignment unit 410 may perform spherical transformation of each of the input image frames. The global alignment unit 410 may obtain translation information between the input image frames through image matching.

The local alignment unit 420 may locally align a right-eye strip and a left-eye strip in a vertical direction in each of the plurality of input image frames based on a 2D reference panoramic image.

The 2D reference panoramic image may be generated based on a central area of each of the plurality of input image frames. The local alignment unit 420 may generate the 2D reference panoramic image by blending predetermined central areas of the input image frames.

For example, the local alignment unit 420 may calculate a correlation value through vertical template matching at a right-eye strip extraction position and a left-eye strip extraction position of the input image frame based on the 2D reference panoramic image. For example, the right-eye strip extraction position and the left-eye strip extraction position may indicate a horizontal position in the input image frame. The horizontal position may be determined based on translation information obtained by the global alignment unit 410. As another example, the correlation value may be calculated by matching feature points. The schemes of matching feature points may vary depend on the kinds of feature points. As another example, the correlation value may be calculated by matching a pattern. As another example, the correlation value may be calculated by matching a histogram.

The local alignment unit 420 may determine a vertical position in the input image frame through template matching. The local alignment unit 420 may extract a right-eye strip and a left-eye strip at a position having a maximum correlation value.

The local alignment unit 420 may extract a left-eye strip and a right-eye strip when a similarity calculated in the plurality of input image frames based on the 2D reference panoramic image has a maximum value. For example, the similarity may be determined based on a correlation value of template matching. That is, when the correlation value is great, the similarity may be determined to be high. As another example, the correlation value may be calculated by matching feature points. The schemes of matching feature points may vary depend on the kinds of feature points. As another example, the correlation value may be calculated by matching the pattern. As another example, the correlation value may be calculated by matching a histogram.

The local alignment unit 420 may generate a left-eye panoramic image and a right-eye panoramic image based on the left-eye strip and the right-eye strip. The local alignment unit 420 may extract a left-eye strip and a right-eye strip having a high similarity based on the 2D reference panoramic image, may generate a left-eye panoramic image by blending left-eye strips, and may generate a right-eye panoramic image by blending right-eye strips, thereby align the left-strips and the right-strips.

The local alignment unit 420 may generate the 3D panoramic image using the left-eye panoramic image and the right-eye panoramic image.

Figure 5:
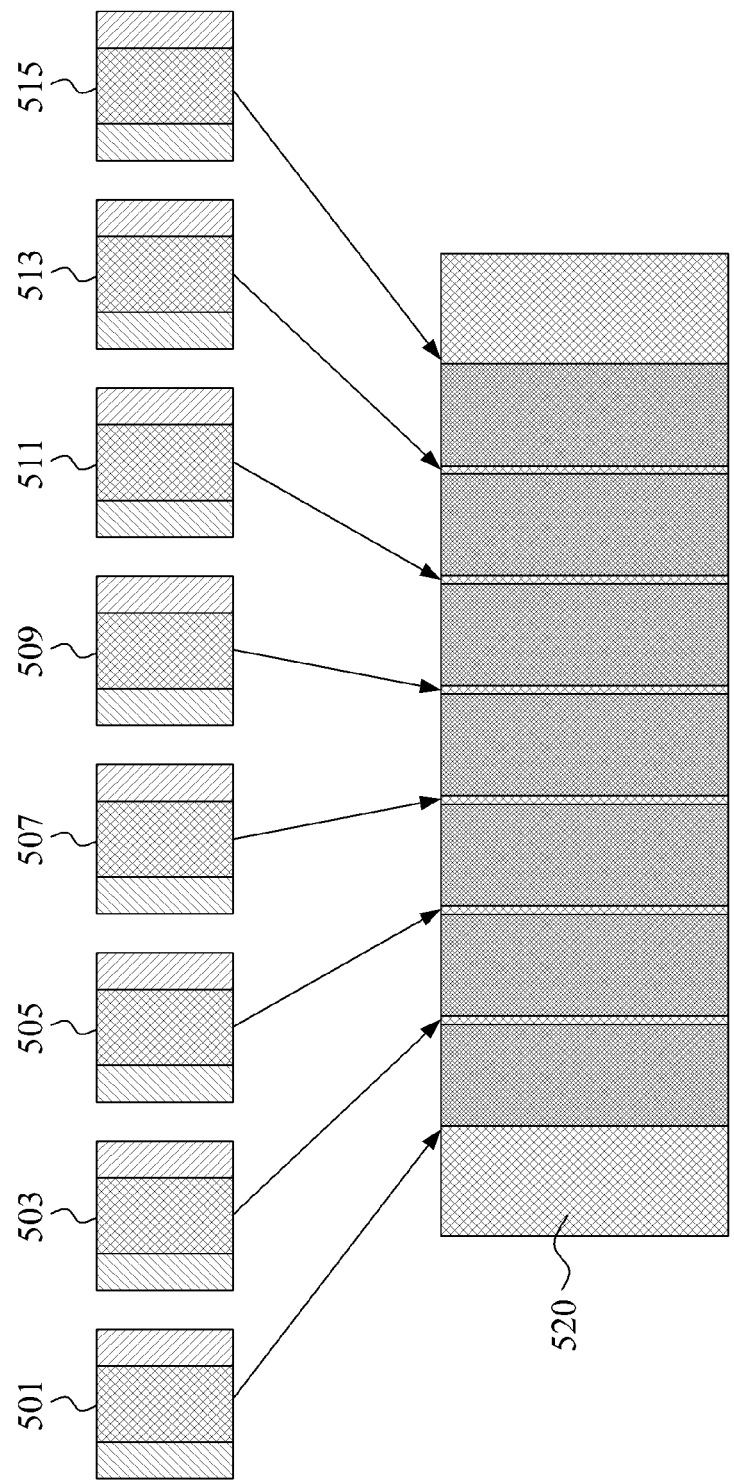
FIG. 5 illustrates a process of generating a two-dimensional (2D) reference panoramic image according to an embodiment.

FIG. 5 illustrates a process of generating a 2D reference panoramic image according to an embodiment.

Due to rotation, both a left-eye strip and a right-eye strip may have an incorrect vertical position information. Therefore, when aligning one of the left-eye strip and the right-eye strip based on the other of the left-eye strip and the right-eye strip, a new error may arise.

A central area of an input image that may be least affected by the rotation may be used as a reference to align both the left-eye strip and the right-eye strip.

Referring to FIG. 5, a 2D reference panoramic image 520 may be generated using central areas 501, 503, 505, 507, 509, 511, 513, and 515 of input images.

Figure 6:
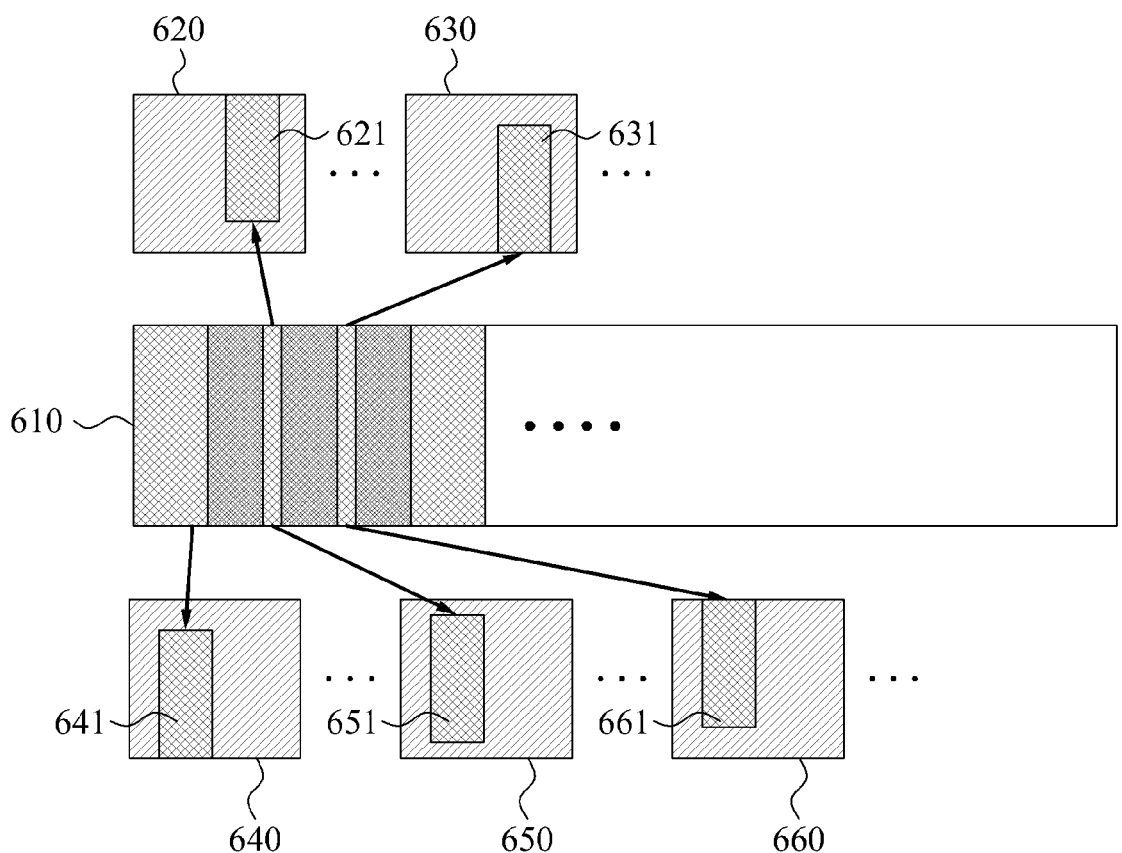
FIG. 6 illustrates a process of extracting a left-eye strip and a right-eye strip according to an embodiment.

FIG. 6 illustrates a process of extracting a left-eye strip and a right-eye strip according to an embodiment.

For example, areas determined to have a maximum similarity to a 2D reference panoramic image 610 through template matching are extracted. The areas are extracted in the form of a left-eye strip and a right-eye strip and by comparing the extracted left-eye strip and right-eye strip to a 2D reference panoramic image 610, the left-eye strip and the right-eye strip may be vertically aligned in correspondence with shaking of a photographing device or camera.

Referring to FIG. 6, left-eye strips 621 and 631 may be extracted from input image frames 620 and 630, respectively, based on the 2D reference panoramic image 610. Right-eye strips 641, 651, and 661 may be extracted from input image frames 640, 650, and 660, respectively.

Here, the left-eye strip 621 extracted from the input image frame 620 and the left-eye strip 631 extracted from the input image frame 630 may have the same horizontal position but different vertical positions. For example, vertical positions of the left-eye strips 621 and 631 may be determined through template matching. As another example, vertical positions of the left-eye strips 621 and 631 may be determined by matching feature points. The schemes of matching feature points may vary depend on the kinds of feature points. As another example, vertical positions of the left-eye strips 621 and 631 may be determined by matching a pattern. As another example, vertical positions of the left-eye strips 621 and 631 may be determined by matching a histogram. The same method may be applied to the right-eye strips 641, 651, and 661.

The right-eye strip 641 extracted from the input image frame 640, the right-eye strip 651 extracted from the input image frame 650, and the right-eye strip 661 extracted from the input image frame 660 may have the same horizontal position but different vertical positions. Vertical positions of the right-eye strips 641, 651, and 661 may be determined through template matching.

Left-eye strips and right-eye strips may be extracted by the number of input image frames corresponding to the 2D reference panoramic image 610.

A left-eye panoramic image may be generated by blending the left-eye strips 621 and 631. A right-eye panoramic image may be generated by blending the right-eye strips 641, 651, and 661.

Figure 7A:
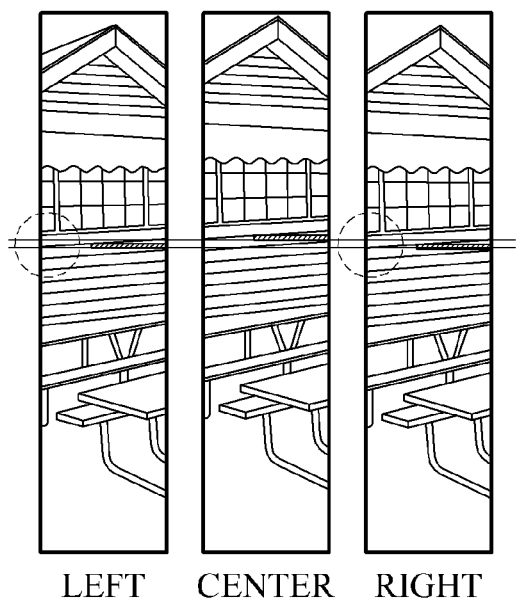
FIGS. 7A and 7B illustrate images before and after local alignment is performed according to an embodiment.
Figure 7B:
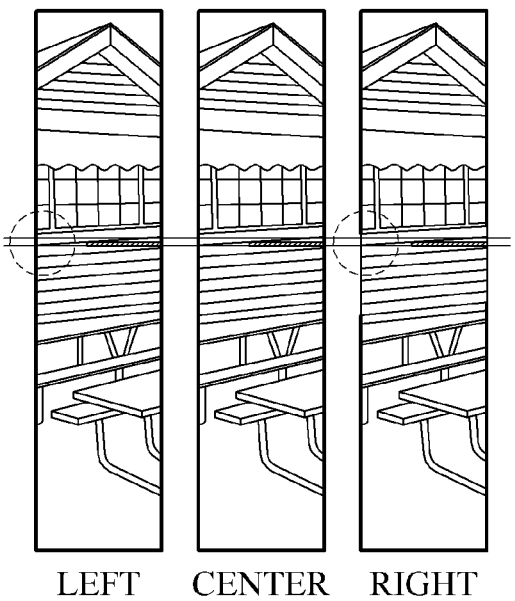

FIGS. 7A and 7B illustrate images before and after local alignment has been performed according to an embodiment.

FIG. 7A shows an example in which a left-eye panoramic image and a right-eye panoramic image mismatch occurs in the vertical direction with respect to the same subject before local alignment is vertically performed. FIG. 7B shows an example in which the left-eye panoramic image and the right-eye panoramic image are aligned after the local alignment has been vertically performed.

More specifically, in a right image of FIG. 7A, a downward rotation has occurred. In a right image of FIG. 7B, the downward rotation of FIG. 7A has been aligned after local alignment is performed in the vertical direction.

FIG. 8 illustrates an image processing method according to an embodiment.

In operation 800, an image processing apparatus may sequentially photograph an image while panning a camera in one direction. Alternatively, when rotating the photographing device in one direction, the image processing apparatus may receive a sequentially photographed image.

In operation 805, the image processing apparatus may perform spherical transformation of a photographed image or an input image. Through the spherical transformation, the image processing apparatus may compensate for any distortion occurring due to the rotation. The image processing apparatus may perform image matching through feature point matching between the spherically transformed images.

In operation 810, the image processing apparatus may calculate a translation amount between the spherically transformed images. When image matching is completed, the image processing apparatus may calculate a translation amount between input images based on the image matching result.

In operation 815, the image processing apparatus may determine whether the translation amount satisfies a predetermined target. When the calculated translation amount does not satisfy the predetermined target, the image processing apparatus may elect not to store a spherically transformed image and may request photographing of the image again.

Conversely, when the calculated translation amount satisfies the predetermined target, the image processing apparatus may store the spherically transformed image in operation 820.

In operation 825, the image processing apparatus may determine whether the number of stored spherically transformed images satisfies the number of images that are desired to generate a 3D panoramic image. For example, the number of images that are desired to generate the 3D panoramic image may be determined based on any one or more of a resolution of the 3D panoramic image, a capacity, and a processing rate of the image processing apparatus.

In operation 830, the image processing apparatus may generate a 2D reference panoramic image. The image processing apparatus may generate the 2D reference panoramic image by blending central areas of spherically transformed images.

In operation 835, the image processing apparatus may extract a left-eye strip. The image processing apparatus may extract a left-eye strip in an input image frame having the same or similar translation amount in comparison with the 2D reference panoramic image. For example, the image processing apparatus may extract the left-eye strip when a similarity calculated through vertical template matching in the input image frame has a maximum value. As another example, the similarity may be calculated by matching feature points. The schemes of matching feature points may vary depend on the kinds of feature points. As another example, the similarity may be calculated by matching a pattern. As another example, the similarity may be calculated by matching a histogram.

In operation 840, the image processing apparatus may extract a right-eye strip. The image processing apparatus may extract a right-eye strip in the input image frame having the same translation amount as the 2D reference panoramic image.

In operation 845, the image processing apparatus may generate a left-eye panoramic image. The image processing apparatus may generate the left-eye panoramic image by blending left-eye strips.

In operation 850, the image processing apparatus may generate a right-eye panoramic image. The image processing apparatus may generate the right-eye panoramic image by blending extracted right-eye strips.

In operation 855, the image processing apparatus may generate a 3D panoramic image. The image processing apparatus may generate the 3D panoramic image based on a disparity between the left-eye panoramic image and the right-eye panoramic image. The image processing apparatus may generate the 3D panoramic image by optimizing the horizontal disparity between the left-eye panoramic image and the right-eye panoramic image.

Figure 9:
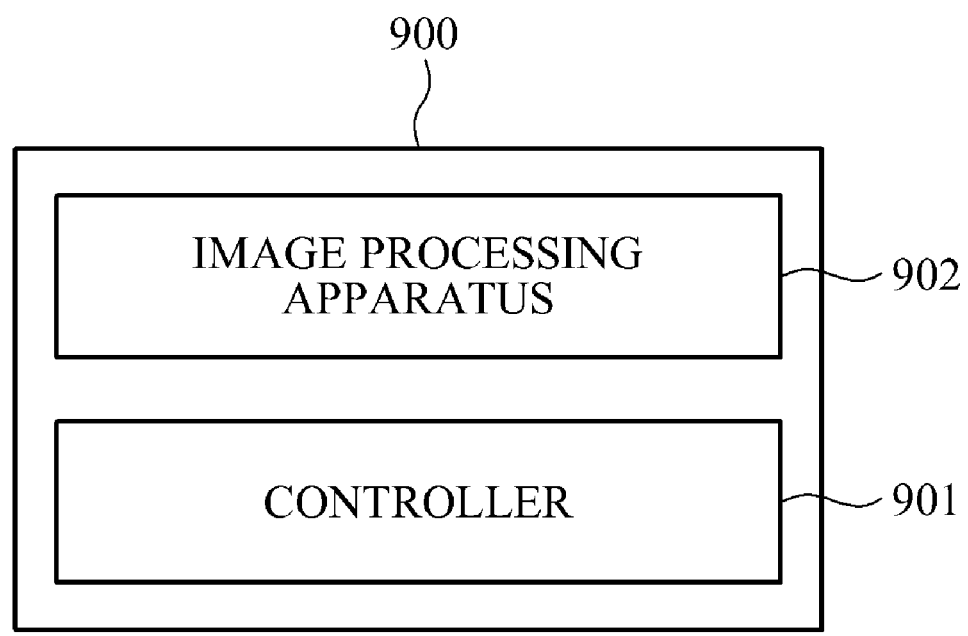
FIG. 9 illustrates a block diagram of a camera including an image processing apparatus according to an embodiment.

FIG. 9 illustrates a camera including an image processing apparatus according to an embodiment.

Referring to FIG. 9, the camera 900 may include, for example, a controller 901 and an image processing apparatus 902.

The camera 900 may be in the form of a digital camera or a digital video camera, although other kinds of cameras are equally possible.

The controller 901 may generate one or more control signals to control the camera 900 and the image processing apparatus 902. The controller 901 may include one or more processors.

The image processing apparatus 902 may be used to generate a 3-D panoramic image for the camera 900 and may include, for example, a reference generator, a strip extractor, a controller, a panoramic image generator, and a 3D panoramic image generator. None of the preceding items are illustrated in FIG. 9, however, each of these units may correspond to similarly named units discussed herein, for example with respect to FIG. 3, and therefore need not be discussed again here.

The image processing apparatus 902 may be installed internally within the camera 900, may be attached to the camera 900, or may be separately embodied from the camera 900. Regardless of its physical configuration, the image processing apparatus 902 has all of the capabilities discussed herein. The image processing apparatus 902 may include one or more internal processors or may be controlled by the one or more processors included within the multi-image processing apparatus 902 such as the one or more processors of controller 901.

According to one or more embodiments, an image processing apparatus may be applied to a camera related product and an image processing method may be employed as software. For example, the image processing apparatus and the image processing method may be applied to a product such as a digital camera and a camera image processing processor, for example.

According to one or more embodiments, an image processing apparatus may generate a 2D reference panoramic image using a central image of an input image that is less susceptible to a variation in rotation caused by shaking of a photographing device, and may generate a left-eye panoramic image and a right-eye panoramic image based on the 2D reference panoramic image.

Using the central area of the input image, it is possible to decrease a failure probability of a left-eye panoramic image and a right-eye panoramic image. The central image may be employed as a source to generate a high quality 3D panoramic image by performing local alignment.

It is possible to overcome constraints of having to tightly photograph an input image in order to prevent a failure of local alignment. For example, it is possible to decrease the number of input image frames used to generate the 3D panoramic image. Accordingly, it is possible to generate a 3D panoramic image even in a low specification camera system.

According to one or more embodiments, an image processing apparatus may prevent a partial alignment failure of a left-eye panoramic image and a right-eye panoramic image that may occur due to a different photographing point in time between the left-eye panoramic image and the right-eye panoramic image with respect to the same subject and a time difference in the photographing moment.

The image processing apparatus may generate a 2D reference panoramic image capable of minimizing the affect of rotation using a central area of an input image.

By generating the left-eye panoramic image and the right-eye panoramic image through local alignment based on the 2D reference panoramic image, it is possible to generate a high quality 3D panoramic image.

Also, using local alignment, it is possible to overcome a photographing constraint of an input image. Therefore, it is possible to generate a 3D panoramic image even in a low specification camera system.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the image processing apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
   a processor to control one or more processor-executable units;
   a reference generator to generate a two-dimensional (2D) reference panoramic image using a central area of each of a plurality of input image frames; and
   a strip extractor to extract, from an input image frame of the plurality of input image frames, a left-eye strip and a right-eye strip when a similarity of the input image frame compared to the 2D reference panoramic image has a maximum value,
   wherein the strip extractor extracts the left-eye strip and the right eye strip from the input image frame when an amount of vertical translation in each strip is most similar to a vertical translation of the 2D reference panoramic image, from among the plurality of input image frames.

2. The image processing apparatus of claim 1, wherein the reference generator generates the 2D reference panoramic image by blending a predetermined central area in each of the plurality of input image frames.

3. The image processing apparatus of claim 1, wherein the strip extractor comprises:
   a left-eye strip extractor to extract the left-eye strip from the input image frame when a similarity calculated from a predetermined left-eye strip extraction position to a vertical direction based on the 2D reference panoramic image has a maximum value; and
   a right-eye strip extractor to extract the right-eye strip from the input image frames when a similarity calculated from a predetermined right-eye strip extraction position to a vertical direction based on the 2D reference panoramic image has a maximum value.

4. The image processing apparatus of claim 1, wherein the strip extractor comprises:
   a left-eye strip extractor to extract the left-eye strip having a maximum correlation value through template matching of a predetermined left-eye strip extraction position in an input image frame corresponding to the 2D reference panoramic image, and
   a right-eye strip extractor to extract the right-eye strip having a maximum correlation value through template matching of a predetermined right-eye strip extraction position in the input image frame corresponding to the 2D reference panoramic image.

5. The image processing apparatus of claim 1, wherein the strip extractor extracts the left-eye strip and the right-eye strip based on a correlation between a color value of a predetermined left-eye strip extraction position and a color value of a predetermined right-eye strip extraction position in an input image frame corresponding to the 2D reference panoramic image.

6. The image processing apparatus of claim 1, wherein the strip extractor extracts the left-eye strip and the right-eye strip having a same width in an input image frame corresponding to the 2D reference panoramic image.

7. The image processing apparatus of claim 1, further comprising:
   a panoramic image generator to generate a left-eye panoramic image and a right-eye panoramic image based on the left-eye strip and the right-eye strip, respectively.

8. The image processing apparatus of claim 7, further comprising:
   a three-dimensional (3D) panoramic image generator to generate a 3D panoramic image based on a disparity between the left-eye panoramic image and the right-eye panoramic image.

9. The image processing apparatus of claim 1, further comprising:
   a processing unit to perform spherical transformation of an image that is input from a photographing device, and to perform image matching by matching a feature point between the spherically transformed images;
   a calculating unit to calculate a translation amount between the spherically transformed images;
   a first determining unit to determine whether the translation amount satisfies a predetermined target; and
   a second determining unit to store the spherically transformed image when the translation amount satisfies the predetermined target, and to determine whether the number of stored spherically transformed images satisfies a value that is used to generate a 3D panoramic image.

10. An image processing apparatus, comprising:
a processor to control one or more processor-executable units;
a global alignment unit to perform image matching of a plurality of input image frames by matching a feature point between the plurality of input image frames; and
a local alignment unit to locally align a right-eye strip and a left-eye strip in a vertical direction in each of the plurality of input image frames using a two-dimensional (2D) reference panoramic image,
wherein the left-eye strip and the right eye strip are extracted from the input image frame when an amount of vertical translation in each strip is most similar to a vertical translation of the 2D reference panoramic image, from among the plurality of input image frames.

11. The image processing apparatus of claim 10, wherein the 2D reference panoramic image is generated based on a central area of each of the plurality of input image frames.

12. The image processing apparatus of claim 10, wherein the local alignment unit extracts the left-eye strip and the right-eye strip when a similarity calculated in the plurality of input image frames based on the 2D reference panoramic image has a maximum value.

13. The image processing apparatus of claim 12, wherein the local alignment unit generates a left-eye panoramic image and a right-eye panoramic image based on the left-eye strip and the right-eye strip.

14. An image processing method, comprising:
generating, by way of a processor, a two-dimensional (2D) reference panoramic image using a central area of each of a plurality of input image frames; and
extracting, from an input image frame of the plurality of input image frames, a left-eye strip and a right-eye strip when a similarity calculated in the input image frame compared to the 2D reference panoramic image has a maximum value,
wherein the extracting comprises extracting the left-eye strip and the right eye strip from the input image frame when an amount of vertical translation in each strip is most similar to a vertical translation of the 2D reference panoramic image, from among the plurality of input image frames.

15. The method of claim 14, wherein the generating comprises generating the 2D reference panoramic image by blending a predetermined central area in each of the plurality of input image frames.

16. The method of claim 14, wherein the extracting comprises:
extracting the left-eye strip from the input image frame when a similarity calculated from a predetermined left-eye strip extraction position to a vertical direction based on the 2D reference panoramic image has a maximum value; and
extracting the right-eye strip from the input image frame when a similarity calculated from a predetermined right-eye strip extraction position to a vertical direction based on the 2D reference panoramic image has a maximum value.

17. The method of claim 14, wherein the extracting comprises:
extracting a left-eye strip having a maximum correlation value through template matching of a predetermined left-eye strip extraction position in an input image frame corresponding to the 2D reference panoramic image; and
extracting a right-eye strip having a maximum correlation value through template matching of a predetermined right-eye strip extraction position in the input image frame corresponding to the 2D reference panoramic image.

18. The method of claim 14, wherein the extracting comprises extracting the left-eye strip and the right-eye strip based on a correlation between a color value of a predetermined left-eye strip extraction position and a color value of a predetermined right-eye strip extraction position in an input image frame corresponding to the 2D reference panoramic image.

19. The method of claim 14, further comprising:
generating a left-eye panoramic image and a right-eye panoramic image based on the left-eye strip and the right-eye strip.

20. A method of creating a three-dimensional (3D) panoramic image from a plurality of sequentially input image frames, the method comprising:
generating a two-dimensional (2D) reference panoramic image using a center portion of each of the sequentially input image frames;
extracting, from an input image frame of the plurality of sequentially input image frames, a left-eye strip and a right-eye strip having an similarity of the input image frame compared to the 2D reference panoramic image has a maximum value; and
generating, by way of a processor, a left-eye panoramic image and a right-eye panoramic image using the extracted left-eye strip and right-eye strip,
wherein the left-eye strip and the right eye strip are extracted from the input image frame when an amount of vertical translation in each strip is most similar to a vertical translation of the 2D reference panoramic image, from among the plurality of input images.

21. A non-transitory computer-readable storage medium encoded with computer readable code comprising a program for implementing the method of claim 20.

22. A camera to create a three-dimensional (3D) panoramic image from a plurality of sequentially input image frames, the camera comprising:
a processor to control one or more processor-executable units;
a reference generator to generate a two-dimensional (2D) reference panoramic image using a center portion of each of the sequentially input image frames; and
a strip extractor to extract, from an input image frame of the plurality of sequentially input image frames, a left-eye strip and a right-eye strip when a similarity of the input image frame compared to the 2D reference panoramic image has a maximum value,
wherein the strip extractor extracts the left-eye strip and the right eye strip from the input image frame when an amount of vertical translation in each strip is most similar to a vertical translation of the 2D reference panoramic image, from among the plurality of sequentially input image frames.

23. The camera of claim 22, further comprising:
a panoramic image generator to generate a left-eye panoramic image and a right-eye panoramic image using the left-eye strip and right-eye strip extracted by the strip extractor.

* * * * *